United States Patent
Lehikoinen et al.

(10) Patent No.: US 9,890,018 B2
(45) Date of Patent: Feb. 13, 2018

(54) OIL COLLECTOR FOR GUIDE RAILS

(71) Applicant: KONE Corporation, Helsinki (FI)

(72) Inventors: Erno Lehikoinen, Saukkola (FI); Jürgen Brucker, Jokela (FI); Heidi Sederholm, Helsinki (FI)

(73) Assignee: KONE CORPORATION, Helsinki (FI)

( * ) Notice: Subject to any disclaimer, the term of this patent is extended or adjusted under 35 U.S.C. 154(b) by 0 days.

(21) Appl. No.: 14/742,426

(22) Filed: Jun. 17, 2015

(65) Prior Publication Data

US 2015/0368069 A1  Dec. 24, 2015

(30) Foreign Application Priority Data

Jun. 18, 2014  (EP) .................................... 14172981

(51) Int. Cl.
*B66B 7/12*  (2006.01)
*F16N 31/02*  (2006.01)

(52) U.S. Cl.
CPC ............ *B66B 7/1269* (2013.01); *F16N 31/02* (2013.01)

(58) Field of Classification Search
CPC ...... F16N 31/02; B66B 7/1269; B66B 7/1253
USPC ........................................... 184/106, 22, 24
See application file for complete search history.

(56) References Cited

U.S. PATENT DOCUMENTS

| | | | | |
|---|---|---|---|---|
| 597,251 A * | 1/1898 | Abt ...................... | B66B 7/1269 | 184/21 |
| 787,978 A * | 4/1905 | Eggler .................. | B66B 7/1269 | 184/22 |
| 860,375 A * | 7/1907 | Hartley et al. ........ | B66B 7/1269 | 184/22 |
| 876,601 A * | 1/1908 | Slaydon ................. | F16N 31/02 | 184/24 |
| 884,957 A * | 4/1908 | Rush ..................... | B66B 7/1269 | 184/21 |
| 984,206 A * | 2/1911 | Garvens et al. ...... | B66B 7/1269 | 184/22 |
| 990,892 A * | 5/1911 | Macindoe ............ | B66B 7/1269 | 184/21 |
| 1,007,422 A * | 10/1911 | Berger .................. | B66B 7/1269 | 184/21 |
| 1,021,190 A * | 3/1912 | Hirz ...................... | B66B 7/1269 | 184/22 |
| 1,045,977 A * | 12/1912 | Hirz ...................... | B66B 7/1269 | 184/22 |
| 1,233,902 A * | 7/1917 | O'Connor ............ | B66B 7/1269 | 184/22 |

(Continued)

FOREIGN PATENT DOCUMENTS

DE  10 2004 054 146 A1  5/2006

*Primary Examiner* — Michael A Riegelman
(74) *Attorney, Agent, or Firm* — Birch, Stewart, Kolasch & Birch, LLP

(57) ABSTRACT

An oil collector for a guide rail, its use and a method for collecting lubricating oil from a guide rail are disclosed. The oil collector includes a receiving element for receiving the lubricating oil flowing along the guide rail, the receiving element including a portion formed to be set against the guide rail. The oil collector is wherein the receiving element includes a block of absorbent material absorbing the lubricating oil. The oil collector can further include a releasable fastening member for pressing the block of absorbent material against the guide rail thereby securing the block of absorbent material in place.

17 Claims, 2 Drawing Sheets

(56) References Cited

U.S. PATENT DOCUMENTS

| | | | | |
|---|---|---|---|---|
| 1,245,764 | A | * | 11/1917 | Paxton .................... F16N 31/02 184/24 |
| 1,274,942 | A | * | 8/1918 | Schenck ............... B66B 7/1269 184/22 |
| 1,643,038 | A | * | 9/1927 | Weigele ................ B66B 7/1269 184/22 |
| 1,805,305 | A | * | 5/1931 | Brady ................... B66B 7/1269 184/102 |
| 1,897,764 | A | * | 2/1933 | Norton ................. B66B 7/1269 184/22 |
| 2,102,814 | A | * | 12/1937 | Walsh ................... B66B 7/1269 184/21 |
| 6,098,756 | A | | 8/2000 | Shigetomi et al. |
| 6,705,430 | B2 | * | 3/2004 | Michioka ........... B23Q 11/0875 184/5 |
| 2013/0126278 | A1 | * | 5/2013 | Sederholm .............. B66B 7/047 187/409 |
| 2014/0020987 | A1 | * | 1/2014 | Mertala .................. F16B 21/06 187/410 |

\* cited by examiner

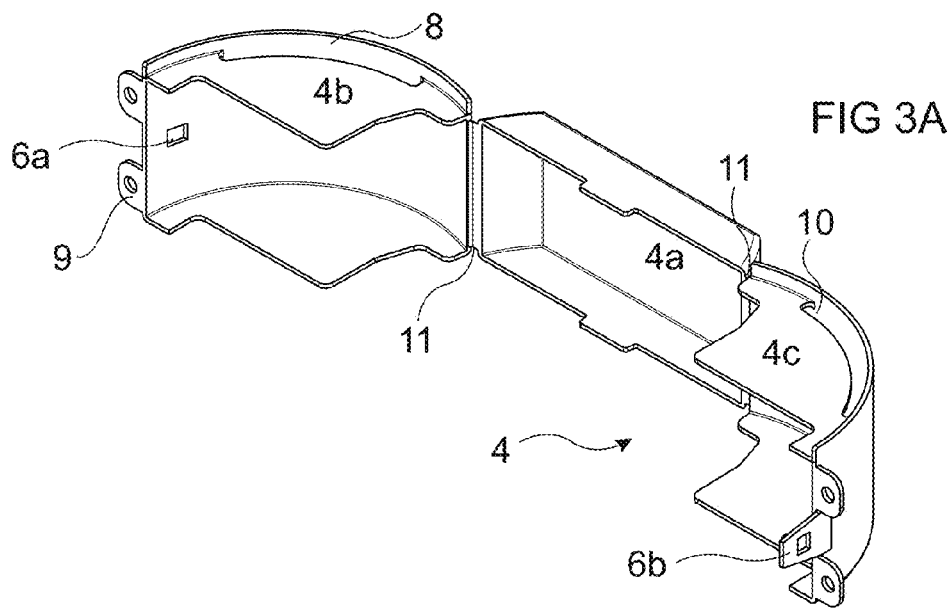
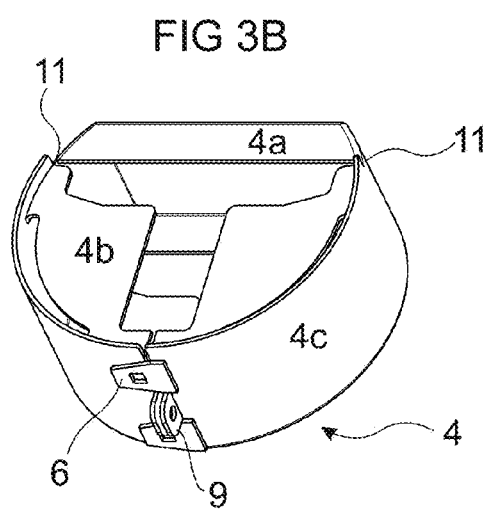
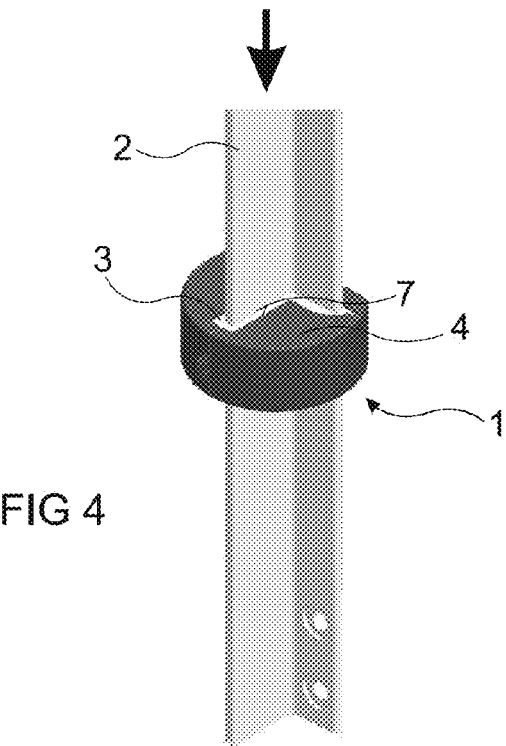

OIL COLLECTOR FOR GUIDE RAILS

TECHNICAL FIELD

The present disclosure relates to a device, its use and a method for collecting lubricating oil flowing along a guide rail.

BACKGROUND ART

Guide rails are used to guide the vertical movement of an elevator in an elevator shaft. There are typically two guide rails for each elevator car, one on its each side. If the elevator is equipped with a counterweight, guide rails are used to guide its movement as well. To ascertain the smooth movement of the elevator car or the counterweight along a guide rail, the guide rail needs to be constantly lubricated. This is achieved by lubricating oil that is slowly released from an oil can or an oil box at the top of the guide rail, above the highest point of the elevator movement. The oil then moves downwards along the guide rail through gravity flow. At the bottom of the guide rail, there is an oil collector. Its purpose is to collect the used oil and to prevent it from dirtying the elevator pit and the machinery therein.

Currently, the oil collectors are oil collecting cups that are fitted around the guide rail. The cups can be made of metal and welded to the guide rail. This alternative is expensive and impractical as the oil collector is rigid and cannot be removed for maintenance work. Alternatively, the oil collector can be made of rubber or similar material and retro-fitted around the guide rail. The advantage of such oil collectors is, that they are cheap to manufacture and to install on different guide rail profiles. However, they are prone to leakage and thus do not fulfil their function ideally.

OBJECTIVE

An objective of the present invention is to provide an improved oil collector for guide rails, its use and a method for collecting lubricating oil.

The oil collector, its use and the method for collecting oil are in particular, but not only, intended for guide rails in elevators, especially in passenger or cargo elevators of buildings. However, the oil collector, its use and the method for collecting oil may be suited for other guide rails as well.

SUMMARY

The present invention is directed to an oil collector, a method for collecting lubricating oil and use of an oil collector.

In one aspect, an oil collector for a guide rail is disclosed. Its purpose is to collect used lubricating oil flowing along a guide rail. It thus prevents the oil from dirtying the structures below the guide rail, such as the elevator pit and the machinery therein.

The oil collector comprises a receiving element for receiving the lubricating oil flowing along the guide rail. The receiving element comprises a portion formed to be set against the guide rail and is characterized in that the receiving element comprises a block of absorbent material absorbing the lubricating oil.

By a guide rail is herein meant any type of a guide rail known in the art. Guide rails can have different profiles, such as a T-profile or rounded profile. The guide rail can be completely or partly hollow, or it can be filled with a material that is different from the material used in the outer structure.

By a receiving element is herein meant a structure that receives the lubricating oil flowing along the guide rail. The receiving element comprises a portion formed to be set against the guide rail. This means that there is some part of the receiving element that is in contact with the guide rail when in use. Its purpose is to prevent lubricating oil from passing the oil collector and flowing further downwards along the guide rail.

According to the present disclosure, the receiving element comprises a block of absorbent material that absorbs the lubricating oil. The block of absorbent material can function as a receiving element alone or there can be additional components in the receiving element. Without limiting the current disclosure to any specific theory, the block of absorbent material is typically able to retain the absorbed lubricating oil due to, for example, capillary force. Therefore, no cup or other additional structure is needed to prevent the lubricating oil from flowing further along the guide rail. The receiving element thus at least temporarily also stores the lubricating oil.

By absorbent material herein is meant material that has an internal structure that is able to create capillary or other forces for drawing in or receiving and holding the lubricating oil. Any material fulfilling this requirement can be used as absorbent material. Typically such material is open-celled foam material. In such a case, the internal structure is usually characterized by the pore size of the foam. This refers to the average pore diameter which is relevant for the capillary force that the foam material is able to produce. However, also many fiber materials have suitable characteristics to be used in the oil collector according to the present disclosure. In one embodiment, the absorbent material is open-celled foam material able to absorb the lubricating oil, for example latex foam or polyurethane foam, such as polyester foam or polyether foam, silicone foam or a combination thereof. In one embodiment, the pore size of the open-celled foam material is selected so, that capillary force of the absorbent material is sufficient to retain the absorbed lubricating oil in the block of absorbent material.

In one embodiment, the open-celled foam material is compressed foam material. Without limiting the current disclosure to any specific theory, the compression of the foam material results in oval-shaped pores that might be beneficial for the absorptive properties of the foam material. Suitable foam materials are commercially available and different alternatives can be used.

In one embodiment, the pore size of the open-celled foam material is 0.1-0.2 mm.

By a block of absorbent material is herein meant a piece formed of the absorbent material that is suitable to be fitted on an guide rail to collect lubricating oil. The block of absorbent material can have any shape, as long as it comprises a portion to be set against the guide rail. The said portion is in contact with the guide rail in a way that the block of absorbent material can absorb lubricating oil flowing along the guide rail. The block of absorbent material can have an external shape of, for example, a ball, disc, prism, cube or it can be irregularly shaped. In some applications, it is possible to use an oil collector according to the present disclosure having more than one block of absorbent material. This configuration might be beneficial for example to accommodate many different guide rail profiles with a single type of a block of absorbent material.

In some embodiments, the block of absorbent material can be, for example, fitted in at least one hole, slit or groove in the guide rail for securing the block of absorbent material in place. There can be an extension or a protruding part in the block of absorbent material which can be used for fitting the block of absorbent material on the guide rail. The shape of the block of material is selected so that, when in use, the block of absorbent material is at least partly in contact with the guide rail surface along which the lubricating oil flows. The block of absorbent material thus receives and absorbs the lubricating oil. The hole, slit or groove in which the block of absorbent material is fitted can be the end opening of a hollow guide rail. Alternatively, it can be specifically made for the purpose. There can be more than one hole, slit or groove in the guide rail for fitting the block of absorbent material on the guide rail.

In some embodiments, temporary fastening methods, such as tape or glue, can be used for securing the block of absorbent material in place.

The size and absorbing capacity of the block of absorbent material can vary according to the specific application of the oil collector. In one embodiment, the absorbing capacity of the block of absorbent material is at least 250 mL, preferably at least 300 mL. By absorbing capacity of the block of absorbent material is herein meant the volume of lubricating oil that can be collected by the block of absorbent material. The absorbing capacity can be selected so that the block of absorbent material has a practical change interval that, for example, allows the block of absorbent material to be changed during regular maintenance work of the machinery, for example an elevator, for which the oil collector is used. For most applications, the absorbing capacity should be at least 250 mL. An absorbing capacity of at least 300 mL allows using the oil collector according to the present disclosure in many types of elevators. There is no fixed upper limit for the absorbing capacity. However, for very large blocks of absorbent material, the weight of the oil might become a problem near the maximum of the absorbing capacity. Holding such a block of absorbent material in place would require increasing pressure from the fastening member, which in turn might negatively affect the internal structure of the block of absorbent material.

The lubricating oil is not necessarily evenly distributed around the guide rail. In some cases, more oil can flow along one branch of the guide rail cross section (for example the "foot" of a T in the T-shaped guide rail). Therefore, it might not be necessary for the portion formed to be against the guide rail to encompass the whole, or even the majority of, the perimeter of the cross section of the guide rail.

In one embodiment, the portion formed to be set against the guide rail is a recess whose shape corresponds to at least a part of the perimeter of the cross section of the guide rail and the recess is openable to allow the placement of the block of absorbent material against the guide rail. In a typical embodiment, the recess is cut in the block of absorbent material to have the approximate shape of the perimeter of the cross section of the guide rail. In some embodiments, the recess corresponds to the perimeter of the cross section of the guide rail closely. The recess comprises an opening or a slit extending to the outer surface of the block of absorbent material so, that it is openable. In this context, openable should be understood as meaning the ability of the block of absorbent material to stretch, twist or bend reversibly to allow it to be mounted on the guide rail. Most suitable absorbent materials are flexible enough so that only a narrow opening or a slit is required achieve this property. In some embodiments, only a part of the perimeter of the guide rail cross section needs to be in contact with the block of absorbent material. In this case, only a minor reversible change in the shape of the block of absorbent material is required to mount it on the guide rail. It is possible for the recess to have a continuously open shape.

The oil collector according to the present disclosure can be used in guide rails of different profiles. The portion formed to be set against the guide rail can be easily designed for the desired guide rail profile. The said portion can essentially surround the guide rail. Alternatively, the said portion can be specifically shaped to accommodate the part of the perimeter of the cross section of the guide rail along which the lubricating oil flows. In one embodiment, the cross section of the guide rail has a T-shaped profile.

In one embodiment, the oil collector further comprises a releasable fastening member for pressing the block of absorbent material against the guide rail thereby securing the block of absorbent material in place. In this case, an oil collector according to the present disclosure comprises a receiving element and a releasable fastening member. By a releasable fastening member is herein meant a structure that presses the receiving element against the guide rail and thus prevents it from sliding downwards. Without limiting the invention to any specific theory, the pressure exerted by the fastening member on the block of absorbent material is at least partially conveyed by the absorbent material to the guide rail thus increasing the friction between the guide rail and the block of absorbent material.

The fastening member is releasable, which means that it can be detached from the receiving element. This is to remove the oil collector from the guide rail, for example for changing the receiving element. It is possible for the fastening member to be attached to and released from the receiving element a number of times. Releasability can be brought about in many different ways for different configurations of the fastening member and the design options are within the knowledge of a skilled person.

The fastening member can be formed in many different ways. For the functioning of the oil collector according to the current disclosure, it is sufficient that it presses the block of absorbent material against the guide rail thereby securing it in place. For example, the fastening member can be made of bent flexible material to form a two-pronged clip, wherein each of the two prongs can be fitted on one side of the guide rail leaving the block of absorbent material between the guide rail and the respective prong. Alternatively, the fastening member can be a tightenable belt surrounding the block of absorbent material, wherein the guide rail is at least partly enclosed within the block of absorbent material.

In one embodiment, the fastening member is made of plastic material, such as polyethylene, high-density polyethylene, low-density polyethylene, polypropylene, polyvinyl chloride, polyethylene terephtalate, polycarbonate, polylactate or a combination thereof. Different plastic materials and their combinations are suited for the manufacture of the fastening member as they are cheap, relatively light and easily moldable to the desired shape. The selection of the material depends on the specific application for which the oil collector according to the present disclosure is meant. It is influenced, for example, by the size and absorption capacity of the block of absorbent material and the structure of the fastening member.

In one embodiment, the fastening member is a casing shaped to at least partly enclose the block of absorbent material. A casing refers to a cover that is designed to at least partially enclose the object, in this case the block of absorbent material. An advantage of such a casing is that the pressure for holding the block of absorbent material in place can come from many directions simultaneously. It has the further advantage that it efficiently protects the block of absorbent material from accidental touching and spreading of the lubricating oil. There are many alternatives for the shape of the casing. It can be, for example, a cylinder, a prism or a ball. The casing can be symmetrically shaped, so that it has two identical sides, either of which can be in the direction of the lubricating oil flowing into the oil collector. Alternatively, the casing can be asymmetrically shaped and have one side designated for being the side receiving the lubricating oil.

The casing can be made of a single part or of at least two parts. If the casing is formed of a single part, the material is typically flexible so, that the casing can be fitted on the guide rail. The casing can have an opening or a slit to allow it to be bent. If the casing is formed of at least two parts, the parts are typically rigid and connected to each other through arrangements that allow the parts to be moved so that the casing can be mounted on the guide rail and removed from it. The parts can be completely detachable from each other. Alternatively, the parts can be permanently attached to each other.

In one embodiment, the casing comprises at least two enclosure portions for forming an openable casing. By an enclosure portion is herein meant a portion of the casing which has a sufficient area to at least partly enclose the block of absorbent material. In this context, openable means that the at the least two enclosure portions can move relative to each other in order to at least partly reveal or conceal the block of absorbent material. The enclosure portions can be detachable from each other or remain together in the open position.

In one embodiment, the at least two enclosure portions are hingedly coupled. In this embodiment, the enclosure portions remain attached to each other through a segment that allows them to move relative to each other. The enclosure portions can be connected to each other directly or through intermediate components of the casing.

In one embodiment, the at least two enclosure portions comprise at least one snap joint for closing the casing. The purpose of the snap joint is to keep the casing firmly closed. Typically, the snap joint is constructed of at least two parts, one in each of the enclosure portions being connected by the snap joint. The snap joint structures can be attached to or form an integral part of the enclosure portion. When the casing is closed, the parts of the snap joint are clamped together. Snap joints are convenient for an oil collector according to the present disclosure as the block of absorbent material needs to be pressed against the guide rail. This means that it will also resist the closing of the casing and immediate snap-joining of the enclosure portions upon closure facilitates the mounting operation. Many types of snap joints are known in the art and choosing a functional alternative is within the competence of the skilled person. There can be additional locking mechanisms in the oil collector to ascertain that the enclosure portions remain in the closed position around the guide rail and are not accidentally released.

The ability of the casing to protect the block of absorbent material is proportional to the extent to which the block of absorbent material is enclosed by the casing. Conversely, the rate at which the block of absorbent material is able to absorb the lubricating oil is proportional to the surface area exposed to the lubricating oil. In one embodiment, the casing is shaped to essentially enclose the block of absorbent material leaving a gap between the guide rail and the casing through which the lubricating oil can flow into the block of absorbent material. The width of the gap can vary within the casing. It might be beneficial to have a wider gap on the side of the casing through which the lubricating oil flows into the oil collector. This would ensure sufficient rate of lubricating oil absorption but at the same time make the casing as rigid as possible. It is emphasized that the casing is not necessary for retaining the lubricating oil in the oil collector. Therefore, it does not need to fit firmly around the guide rail. The casing may comprise further openings or gaps to allow faster lubricating oil absorption if the lubricating oil flow rate temporarily exceeds the rate at which the lubricating oil is absorbed by the block of absorbent material through the gap between the guide rail and the casing. It is possible that the side of the casing receiving the lubricating oil is completely open.

It is possible that the rate of lubricating oil flowing along the guide rail varies. Therefore, the oil collector can have means for temporarily holding or redirecting the possible overflow which can be created if the oil flow rate exceeds the rate at which it is absorbed into the block of absorbent material. In one embodiment, the casing comprises means for temporarily holding lubricating oil when the lubricating oil flow rate exceeds the rate at which the lubricating oil is absorbed by the block of absorbent material. The top part of the oil collector can have, for example, a concave shape or there can be a rim extending upwards from the casing. Both alternatives create a basin-like structure that can temporarily hold the lubricating oil.

The oil collector according to the present disclosure can be used for any oil-lubricated guide rail. Typical field of application is elevatoring, where long vertical guide rails are used to guide the vertical movement of an elevator car and a counterweight in an elevator shaft. The counterweight is an optional structure which is not present in all elevators. However, when the elevator comprises a counterweight, it typically has at least one guide rail to guide its vertical movement. Also for an elevator car, at least one guide rail is used for guiding its vertical movement. With a guide rail for an elevator is herein meant a guide rail for an elevator car or a guide rail for a counterweight. In one embodiment, the guide rail is a guide rail for an elevator. The elevator can be, for example, a passenger elevator or a cargo elevator.

The lubricating oil flows, typically rather slowly, along the guide rail and lubricates the guide rail. The oil collector can be placed anywhere below the lowest point of the guide rail that needs to be lubricated. When the lubricating oil reaches the oil collector, it will contact the block absorbent material. Without limiting the present invention to any specific theory, the lubricating oil enters the space or spaces in the absorbent material by the combination of gravity flow and capillary forces and gradually fills the said space or spaces. When the space or spaces in the block of absorbent material is or are completely filled by the lubricating oil, the block of absorbent material is saturated and it needs to be exchanged. Thus, when the flow rate of the lubricating oil and the absorbing capacity of the block of absorbent material are known, it is possible to calculate a suitable exchange interval of the absorbent material. Conversely, if the machinery, for example an elevator, in which the oil collector according to the present invention is installed has a known maintenance interval, the absorbent capacity of the block of absorbent material can be selected so, that its exchange interval matches with the maintenance interval. In one aspect, the use of the oil collector according to the present disclosure for collecting lubricating oil flowing along the guide rail is disclosed. In another aspect, a method for collecting lubricating oil flowing along a guide rail is disclosed. The method is characterized in that it comprises, in any order, the steps of a) optionally removing an old oil collector from the guide rail;

b) mounting an oil collector according to the present disclosure on the guide rail below the lowest point at which lubricating oil is used; and c) leaving the oil collector in place for a predetermined time to collect the lubricating oil.

The method of collecting lubricating oil with an oil collector according to the present disclosure is achieved by first removing an old oil collector from the guide rail. If the oil collector to be removed is one according to the present disclosure, the procedure is as follows: If appropriate, the additional locking mechanism is unlocked and the snap joints are opened. The fastening member is opened, and removed. Then, the block of absorbent material is removed and disposed of appropriately. If the fastening member is used and it is still functional, it can be reused. As the manufacture of the fastening members is inexpensive, it can be discarded if it shows signs of wearing.

The old oil collector can be any type of an oil collector known in the art. If the old oil collector is difficult or impossible to remove, it can be left on the guide rail if the oil collector to be mounted fits on the guide rail above the old oil collector without disturbing the guide rail function.

The oil collector according to the present disclosure is mounted on the guide rail by either first placing the block of absorbent material on the guide rail and then fitting the fastening member on it, or first placing the block of absorbent material in the fastening member and mounting the oil collector on the guide rail. The order of steps in the method depends on the specifics of the oil collector and the block of absorbent material.

The oil collector can be fitted anywhere on the guide rail below the lowest point of the guide rail which needs to be lubricated. Practical aspects, such as the ease of maintenance work, low possibility of accidental touching and the position of other machinery near the guide rail, determine the most suitable position for the oil collector.

The oil collector and the method for its use according to the present disclosure offer at least one of the following advantages over prior art:

An advantage of the oil collector according to the present disclosure is that it reliably collects the lubricating oil flowing along the guide rail.

Another advantage of the oil collector according to the present disclosure is that it can be enclosed in a casing that prevents accidental smearing of the lubricating oil.

Another advantage of the oil collector according to the present disclosure is that it is cheap to construct and quick to replace.

Yet another advantage of the oil collector according to the present disclosure is that it can be retrofitted to existing guide rails and it can easily be modified to fit different guide rail sizes and profiles as well as different lubricating oil flow rates.

Yet another advantage of the oil collector according to the present disclosure is that the exchange interval of the absorbent material can be predicted and that the block of absorbent material can be changed while reusing the fastening member.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention but the invention is not limited to the specific embodiments illustrated in the drawings.

In the drawings:

FIG. 3A presents a fastening member according to the present disclosure. The fastening member forms a casing and in FIG. 3A the casing is open.

FIG. 3B presents a fastening member according to the present disclosure. The fastening member forms a casing and in FIG. 3B the casing is closed.

FIG. 4 presents an oil collector according to the present disclosure mounted on a guide rail.

DETAILED DESCRIPTION

Figure 1A:
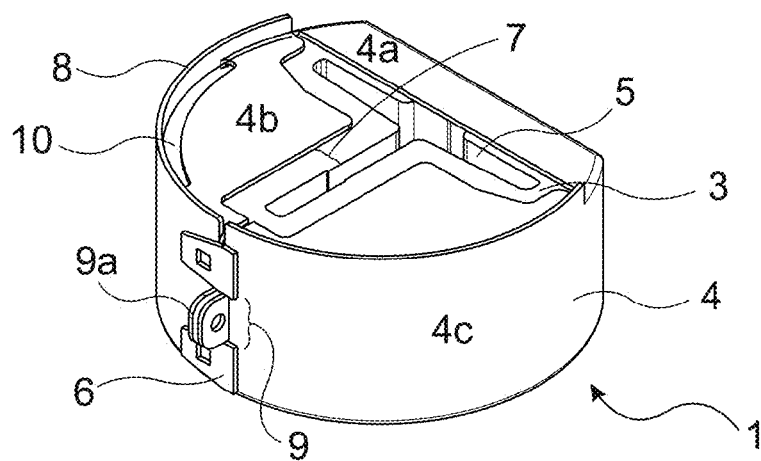
FIG. 1A presents an overview of one embodiment of the oil collector according to the present disclosure.

FIG. 1A presents an overview of one embodiment of the oil collector 1 according to the present disclosure. The oil collector 1 comprises a receiving element 3 and a fastening member 4. The receiving element 3 is formed as a block of absorbent material 3 and has a portion 5 formed to be set against a guide rail 2, which is a recess 5. The fastening member 4 is a casing 4. The oil collector 1 is in closed position and the guide rail 2 is omitted. However, the oil collector 1 in FIG. 1A is approximately in the orientation in which it would be used, i.e. the guide rail 2 would be vertical and the lubricating oil would enter the oil collector 1 from the side of the block of absorbent material 3 visible in the figure.

The block of absorbent material 3 is made of foam material and the recess 5 is cut into it. The recess 5 is shaped to closely follow the cross sectional perimeter of a T-profiled guide rail 2 (not shown). Thus, the portion 5 formed to be set against a guide rail 2 covers most of the cross-sectional perimeter of the guide rail 2. The precise shaping of the recess 5 allows a uniform pressure to be exerted on the block of absorbent material 3 by the casing 4, which again improves the uniformity of lubricating oil absorption by the block of absorbent material 3.

The casing 4 comprises three enclosure portions, 4a, 4b, 4c, which are hingedly coupled (cf. FIG. 3A). In FIG. 1A, each enclosure portion 4a, 4b, 4c covers a part of the block of absorbent material 3 leaving a gap 7 between the guide rail 2 and the casing 4. The lubricating oil flows into the oil collector 1 through the gap 7. The casing 4 is made of rigid plastic material with methods known in the art.

The casing 4 comprises means 8 for temporarily holding lubricating oil when the lubricating oil flow rate exceeds the rate at which the lubricating oil is absorbed by the block of absorbent material 3. The means 8 for temporarily holding the lubricating oil is a rim 8 that extends from the casing 4. The rim surrounds most of the side of the casing 4 from which the lubricating oil flows into the oil collector 1. The casing 4 is asymmetrically shaped and there is no rim 8 on the other side of the casing 4, i.e. on the side which faces away from the direction of the lubricating oil flow.

There are two further gaps 10 in the oil collector 1 of FIG. 1A. In situations where the lubricating oil flow rate exceeds the rate at which it is absorbed by the block of absorbent material 3 through the gap 7, the further gaps 10 increase the surface of the block of absorbent material 3 available for lubricating oil absorption. In the embodiment of FIG. 1A, the further gaps 10 are located at the rim 8. This can be a structurally favorable position, but other positions and shapes of the further gaps 10 can be envisaged.

The oil collector 1 in FIG. 1A has two snap joints 6 for closing the casing 4 of the oil collector (explained in more detail in connection with FIG. 3A). The oil collector 1 also has an additional locking mechanism 9, which can optionally be used for ascertaining that the casing 4 remains closed. The additional locking mechanism 9 is formed of two identical lugs 9a with holes, one lug 9a on each of the two enclosure portions 4b, 4c, to be locked by the locking mechanism 9. The lugs 9a are positioned so that when the casing 4 is closed, the lugs 9a come together and their holes are aligned. Any suitable means, such as a wire or a locking pin, can be fitted through the holes in the lugs 9a to lock the two enclosure portions 4b, 4c in position. The snap joints 6 and additional locking mechanism 9 are releasable to allow the casing 4 to be re-opened.

Figure 1B:
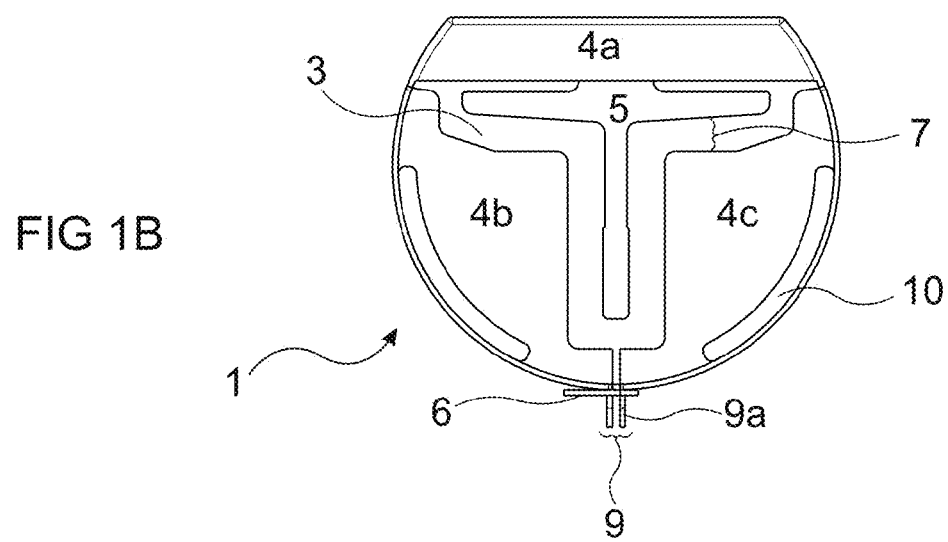
FIG. 1B presents the oil collector of FIG. 1A viewed in the direction of the guide rail.

FIG. 1B depicts the oil collector 1 of FIG. 1A seen from the direction of the lubricating oil flowing into the oil collector 1. In addition to the features described above, it can be seen that the recess 5 continues under the enclosure portion 4a and that the gap 7 is of variable width in different positions along the perimeter of the guide rail 2. Both further holes 10 are visible.

Figure 2:
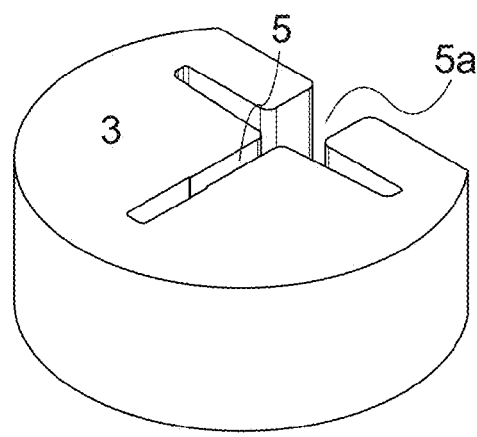
FIG. 2 presents an overview of the block of absorbent material used in the oil collector of FIG. 1.

FIG. 2 depicts the block of absorbent material 3 used in the oil collector 1 of FIG. 1. The opening 5a of the recess 5 is visible. In FIGS. 1A and 1B the opening 5a was mostly covered by the enclosure portion 4a. When the oil collector 1 is mounted on the guide rail 2, the recess 5 in the block of absorbent material 3 is opened enough to fit the guide rail 2 through the opening 5a of the recess 5. The block of absorbent material 3 is positioned as desired and the foam material is allowed to return to its original shape, thus surrounding most of the guide rail 2 perimeter. Only the area of the perimeter of the guide rail 2 at the opening 5a is left without contact to the absorbent material.

FIG. 3A depicts a casing 4 according to the present disclosure. The casing 4 comprises three enclosure portions 4a, 4b, 4c. Two adjacent enclosure portions 4a, 4b, 4c are hingedly coupled through hinges 11 for opening and closing the casing 4.

The casing 4 has one snap joint 6. The snap joint comprises a hole 6a in the enclosure portion 4b and an arm 6b comprising a hook in the enclosure portion 4c. The hook of the arm 6b is constructed as known for snap joints to snap into the hole 6a for fixing the enclosure portions 4b and 4c into position when the casing 4 is closed.

The further holes 10 are visible on the side from which the lubricating oil flows into the oil collector 1. There are no further holes 10 on the side of the casing 4 that faces away from the lubricating oil flowing in to the oil collector 1. This exemplifies the possibility of constructing an oil collector 1 in an asymmetric way to optimize its structures and to designate one side as the side receiving the inflowing lubricating oil. The casing 4 can comprise coloring or other additional features to indicate the direction in which the oil collector 1 is to be mounted on the guide rail 2.

FIG. 3B displays a closed casing 4. The enclosure portions 4b, 4c have been turned towards each other at the hinges 11 until they meet. The casing 4 forms a structure that can enclose the block of absorbent material 3 almost completely and leaves free space through which the guide rail 2 can pass. The space is large enough to also comprise the gap 7 through which the lubricating oil flows into the oil collector 1. In this embodiment, there are two snap joints 6 and one additional locking mechanism 9. The snap joints 6 affix the enclosure portions 4b, 4c in position and the locking mechanism 9 can optionally be used to further secure the closure of the casing 4. The enclosure portion 4a encloses the side of the guide rail 2 on which the opening 5a of the block of absorbent material 3 is situated.

FIG. 4 displays an oil collector 1 mounted on a guide rail 2. The guide rail 2 is a guide rail 2 for an elevator and it has a T-shaped profile. The direction of the lubricating oil flow is indicated with an arrow. In the oil collector 1 of FIG. 4, there is only an additional locking mechanism 9 visible. A snap joint 6 can be either omitted from this embodiment or it can be constructed on the inside of the casing 4.

The above embodiments are to be understood as illustrative examples of the invention. Further embodiments of the invention are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. An oil collector for a guide rail having a T-shaped cross-sectional profile, comprising:
 a receiving element for receiving lubricating oil flowing along the guide rail and configured to contact the guide rail, the receiving element is a block of absorbent material configured to absorb the lubricating oil, and
 a casing encompassing an entire outer cross-sectional profile of the receiving element and an entire outer cross-sectional profile of the guide rail when viewed from a top view of the receiving element and when the casing is closed,
 wherein the casing comprises enclosure portions, and
 wherein the receiving element comprises a T-shaped recess having a shape corresponding to the T-shaped cross-sectional profile of the guide rail.

2. The oil collector according to claim 1, wherein the casing is configured to uniformly press the receiving member against the guide rail thereby securing the receiving member in place.

3. The oil collector according to claim 2, wherein the fastening member is made of plastic material.

4. The oil collector according to claim 1, wherein the absorbent material of the receiving element is open-celled foam material able to absorb the lubricating oil.

5. The oil collector according to claim 4, wherein a pore size of the open-celled foam material is selected so that a capillary force of the absorbent material of the receiving element is sufficient to retain the absorbed lubricating oil in the receiving element.

6. The oil collector according to claim 4, wherein the open-celled foam material is compressed foam material.

7. The oil collector according to claim 4, wherein the open-celled foam material is latex foam or polyurethane foam.

8. The oil collector according to claim 7, wherein the latex foam or polyurethane foam is polyester foam or polyether foam, silicone foam or a combination.

9. The oil collector according to claim 1, wherein the enclosure portions comprise first, second and third enclosure portions, and wherein each of the first and third enclosure portions comprise a hinge located at a side surface thereof and each hinge is coupled to a respective side surface of the second enclosure portion.

10. The oil collector according to claim 1, wherein the at least two enclosure portions comprise at least one snap joint for closing the casing.

11. The oil collector according to claim 1, wherein the casing is shaped to enclose the receiving element to leave a gap between the guide rail and the casing through which the lubricating oil can flow into the receiving element.

12. The oil collector according to claim 1, wherein the casing comprises a vertically extending rim configured to temporarily hold lubricating oil when the lubricating oil flow rate exceeds the rate at which the lubricating oil is absorbed by the receiving element.

13. The oil collector according to claim 1, wherein the absorbing capacity of the receiving element is at least 250 mL.

14. The oil collector according to claim 1, wherein the guide rail is for an elevator.

15. A method for collecting lubricating oil from a guide rail, wherein the method comprises, in any order, the steps of:
  optionally removing an old oil collector from the guide rail;
  mounting the oil collector according to claim 1 on the guide rail below the lowest point at which lubricating oil is used; and
  leaving the oil collector in place for a predetermined time to collect the lubricating oil.

16. A method comprising the step of using the oil collector according to claim 1 for collecting lubricating oil flowing along the guide rail.

17. The oil collector according to claim 1, wherein each enclosure portion covers a top surface of the receiving element and provides a gap between the guide rail and the casing.

* * * * *